March 10, 1964     W. W. POINDEXTER     3,124,117
MOTOR VEHICLE SPEED INDICATING AND INHIBITING DEVICE
Filed Dec. 22, 1961     3 Sheets-Sheet 1
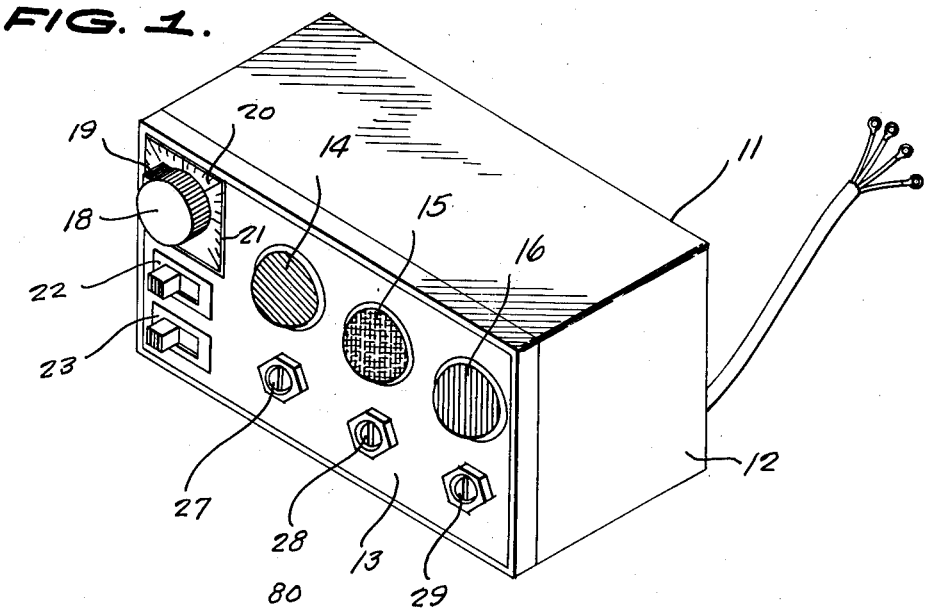
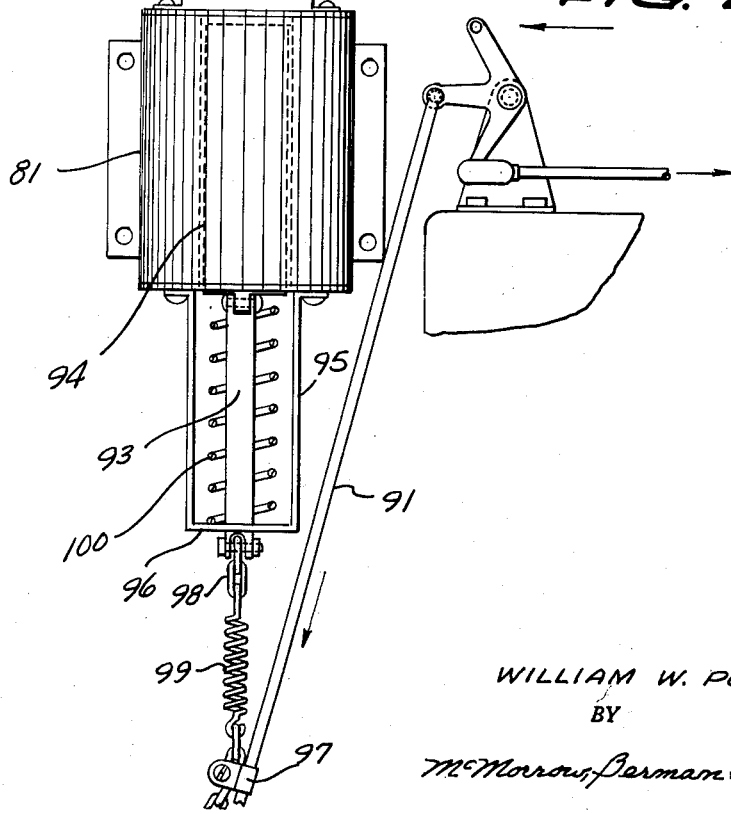
INVENTOR.
WILLIAM W. POINDEXTER,
BY
McMorrow, Berman & Davidson
ATTORNEYS

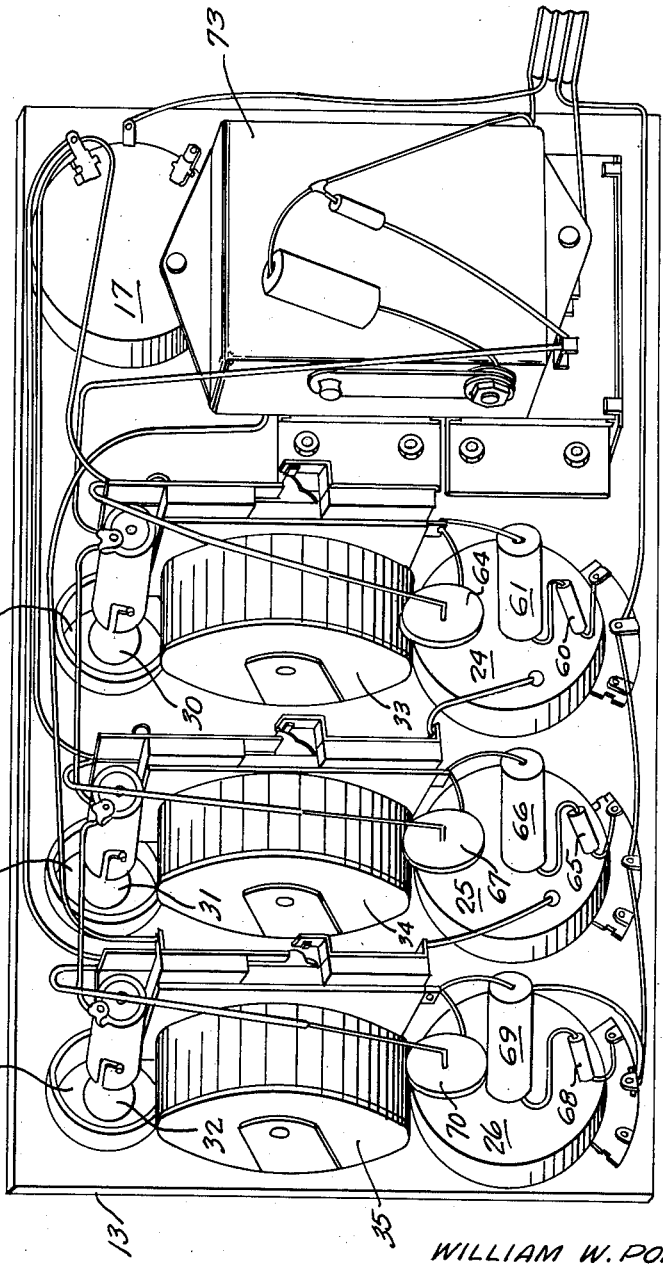

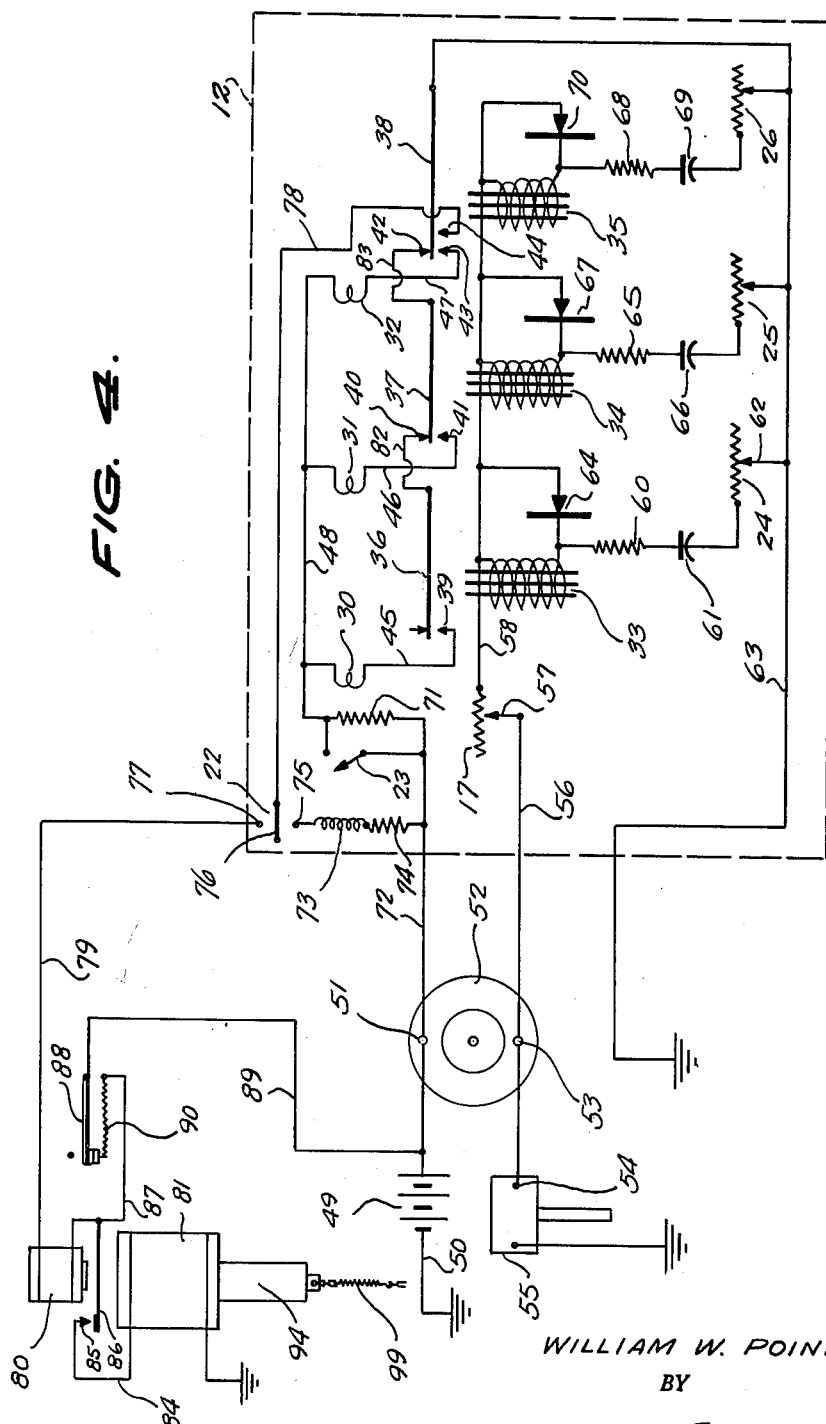

United States Patent Office 3,124,117
Patented Mar. 10, 1964

3,124,117
MOTOR VEHICLE SPEED INDICATING AND
INHIBITING DEVICE
William W. Poindexter, 1 White Oak Drive,
Newport News, Va.
Filed Dec. 22, 1961, Ser. No. 161,604
11 Claims. (Cl. 123—102)

This invention relates to motor vehicle safety devices, and more particularly to an apparatus for automatically indicating various speed levels of a motor vehicle and for automatically providing an alarm at a predetermined speed level, while simultaneously imposing a restraining force on the fuel supply control member associated with the vehicle engine so as to require the vehicle operator to exert substantially more than the normally required force on the accelerator pedal of the vehicle in order to maintain a vehicle speed above the safe limit.

A main object of the invention is to provide a novel and improved speed indicating and inhibiting device for a motor vehicle, said device being relatively simple in construction, being easy to install, and being entirely automatic in operation.

A further object of the invention is to provide an improved automatic speed indicating and inhibiting device which is adapted to provide a positive indication when the motor vehicle in which it is installed reaches a predetermined safe limiting speed, and to simultaneously impose a restraining force on the vehicle accelerator pedal which makes it difficult for the vehicle operator to exceed the predetermined safe limiting speed, but at the same time allowing the accelerator pedal to be depressed against the inhibiting force to enable the operator to increase the speed of the vehicle if so required, for example, in order to pass another vehicle.

A still further object of the invention is to provide an improved automatic speed indicating and inhibiting device, said device involving relatively inexpensive components, being durable in construction, and being relatively compact in size so that it may be easily installed in a motor vehicle without requiring modification of the vehicle.

A still further object of the invention is to provide an improved speed indicating and speed inhibiting device which is adapted to be connected to an easily accessible portion of a motor vehicle electrical system, and which operates in accordance with vehicle speed, the device being effective to impose a restraining force on the fuel supply control member of the vehicle when a predetermined safe limiting speed is reached, the force being applied in an intermittent manner so as to prevent heat damage to the components of the device, but operating at sufficiently close intervals so that the vehicle operator is effectively restrained from maintaining the vehicle speed for any significant period of time above the predetermined safe value unless the operator employs an excessive amount of force on the accelerator pedal.

Further objects and advantages of the invention will become apparent from the following description and claims, and from the accompanying drawings, wherein:

FIGURE 1 is a perspective view of the main control and indicating unit forming part of an improved speed indicating and speed inhibiting device constructed in accordance with the present invention.

FIGURE 2 is a side elevational view of the speed inhibiting solenoid forming part of the device of the present invention, showing its connection to the movable fuel supply control rod of the motor vehicle with which the device is associated.

FIGURE 3 is an enlarged perspective rear view of the main panel of the control unit of FIGURE 1, showing the various components of the control unit.

FIGURE 4 is a schematic wiring diagram showing the electrical connections of the automatic speed indicating and inhibiting device illustrated in FIGURES 1, 2 and 3.

Referring to the drawings, 11 generally designates the main control unit of the speed indicating and inhibiting device, said main control unit comprising a housing 12 adapted to be suitably mounted in the passenger compartment of the motor vehicle within easy reach of the operator of the vehicle and in a position to be easily viewed by said operator. The unit 11 is provided with a front panel 13 on which are mounted the respective colored indicating lenses 14, 15 and 16, for example, green, amber and red lenses, for indicating various designated vehicle speed levels, as will be presently explained. Also mounted on the panel 13 is a main speed-selecting rheostat 17 provided with a control knob 18 having a pointer 19 which may be moved in relation to a scale 20 provided on a scale plate 21 secured to the panel adjacent the knob as illustrated in FIGURE 1. Mounted on the panel below the rheostat 17 are respective control switches 22 and 23, presently to be described.

Mounted on the panel 13 beneath the respective lenses 14, 15 and 16 are respective individual speed level adjusting rheostats 24, 25 and 26, said rheostats being provided with the slotted control shafts 27, 28 and 29 which are accessible from the front of the unit 11 and which may be adjusted by means of a screwdriver or similar implement.

Mounted in the housing 12 behind the respective lenses 14, 15 and 16 are respective signal lamps 30, 31 and 32, said lamps being supported in conventional lamp sockets and being connected to the circuit of the device through said sockets in the manner indicated in FIGURE 4, now to be described.

Mounted in the housing 12 are respective relays 33, 34 and 35 which are associated with the respective signal lamps 30, 31 and 32, and which are provided with the respective movable armatures 36, 37 and 38. Relay 33 is provided with a stationary contact 39 which is engageable by the armature 36 responsive to the energization of said relay. Relay 34 is provided with an upper stationary contact 40 and a lower stationary contact 41, the armature 37 normally engaging the upper contact 40 but moving downwardly therefrom to engage the lower contact 41 responsive to the energization of the relay 34.

The armature 38 normally engages an upper contact 42 provided on the relay 35, but is movable downwardly to disengage from the upper contact 42 and to simultaneously engage a pair of lower contacts 43 and 44 responsive to the energization of the relay 35, the armature 38 being of conductive material so that the contacts 43 and 44 are thus bridged when the relay 35 is energized.

As shown in FIGURE 4, one terminal of each of the lamps 30, 31 and 32 is connected to a corresponding lower stationary contact of the relays 33, 34 and 35. Thus, one terminal of lamp 30 is connected by a wire 45 to the stationary contact 39, one terminal of the lamp 31 is connected by a wire 46 to the lower stationary contact 41 of relay 34, and one terminal of the lamp 32 is connected by a wire 47 to the lower contact 43 of relay 35. The remaining terminals of the lamps 30, 31 and 32 are connected to a common wire 48.

The vehicle battery is designated at 49, and is provided with one grounded pole 50, for example, a negative pole, as illustrated. The positive pole of the battery 49 is connected in the usual manner to the low tension terminal 51 of the vehicle induction coil 52. The breaker point terminal 53 of the induction coil 52 is connected to the breaker point binding post 54 of the vehicle distributor 55 in the conventional manner. As will be readily understood, the operation of the distributor 55 provides alternate building up and collapse of magnetic flux in the low tension winding of the coil 52, resulting from the opening and closing of the breaker points of the distributor. This produces an alternating voltage as between terminal 53 and ground, the magnitude of which depends upon the speed of the vehicle engine, since the vehicle engine speed controls the frequency of opening and closing of the breaker points, and thus controls the rate of speed at which the flux builds up and collapses in the low tension winding of the induction coil 52.

A wire 56 is connected between the terminal 53 and the adjustable contact 57 of rheostat 17. The remaining terminal of rheostat 17 is connected to a wire 58, and one terminal of the winding of each of the relays 33, 34 and 35 is connected to said wire 58, as shown. The remaining terminal of the winding of relay 33 is connected through a resistor 60 and a condenser 61 to one terminal of the resistance winding of rheostat 24. The sliding contact 62 of said rheostat is connected to a grounded wire 63. A rectifier 64 is connected across the winding of the relay 33 in the manner illustrated so that the relay will receive pulsating direct current. The amount of current received by the winding of relay 33 is determined first by the speed of the vehicle engine, since this determines the magnitude of the voltage available between terminal 53 and ground, secondly by the adjustment of the main control rheostat 17, and lastly by the adjustment of the control rheostat 24.

The winding of relay 34 is connected in a similar manner between the wire 58 and the wire 63 to a resistor 65, a condenser 66 and the control rheostat 25. A rectifier 67 is connected across the winding of the relay 34 so that pulsating direct current will flow through said winding when the vehicle is in operation. The winding of relay 35 is similarly connected between wires 58 and 63 through a resistor 68, a condenser 69 and the control rheostat 26, a rectifier 70 being connected across the winding of relay 35 to provide pulsating direct current in the winding of the relay when the device is in operation.

The wire 48 is connected to the positive terminal of the battery 49 through a resistor 71 and a wire 72, which may be connected to the terminal 51 of coil 52, as shown. The resistor 71 is used to reduce the brightness of the lamps 30, 31 and 32 for night driving. Under daylight conditions, switch 23 is closed, so that the lamps will be energized with sufficient current to render them visible under such conditions. However, the switch 23 is opened for night driving so as to reduce the amount of energizing current received by said lamps and thus to reduce the glare thereof, which otherwise would create a hazard to the operator of the vehicle.

Designated at 73 is an audible electrically operated indicating device, such as a buzzer, or the like, which is mounted inside the housing 12 and which is connected through a suitable resistance 74 between the wire 72 and a stationary contact 75 of the switch 22. Switch 22 is of the single pole, double-throw type, and comprises a movable pole 76 which may be selectively engaged with either the stationary contact 75 or an opposite stationary contact 77. Pole 76 is connected by a wire 78 to the stationary contact 44 associated with the relay 35. Stationary contact 77 is connected by a wire 79 to one terminal of the winding of an auxiliary relay 80 controlling the operation of a speed inhibiting solenoid 81, presently to be described.

By suitably adjusting the main rheostat 57 and the respective subsidiary control rheostats 24, 25 and 26, the relay 33 will become energized at a first designated vehicle speed, for example, a speed representing a normal safe cruising speed, whereby armature 36 engages contact 39, energizing the green-indicating signal lamp 30 (assuming switch 23 to be closed) through a circuit comprising wire 72, switch 23, the filament of lamp 30, wire 45, contact 39, armature 36, a wire 82 connecting armature 36 to contact 40, armature 37, a wire 83 connecting armature 37 to contact 42, armature 38, and wire 63, which is connected to ground. When the vehicle speed rises sufficiently, the relay 34 will become energized, assuming that rheostat 25 is set to a value so that the combined resistance of rheostat 25 and resistor 65 is somewhat greater than the combined resistance of rheostat 24 and resistor 60, in accordance with the second speed level designation desired. Thus, the relay 34 will become energized when a somewhat greater voltage is developed between wire 56 and ground than the voltage required to energize the relay 33. The energization of relay 34 causes armature 37 to engage its lower contact 41, deenergizing the green-indicating lamp 30 and energizing the amber-indicating lamp 31 through a circuit comprising wire 72, switch 23, wire 48, the filament of lamp 31, contact 41, armature 37, wire 83, armature 38, and the grounded wire 63.

At a still higher speed, determined by the setting of the rheostat 26, such that the combined resistance of the rheostat 26 and the resistor 68 is greater than the combined resistance of the rheostat 25 and the resistor 65, the relay 35 becomes energized and causes the armature 38 to move downwardly into bridging engagement with the contacts 43 and 44. This deenergizes the amber-indicating lamp 31 and energizes the red-indicating lamp 32 through a circuit comprising the wire 72, the switch 23, the wire 48, the filament of lamp 32, the wire 47, the contact 43, the armature 38 and the grounded wire 63. At the same time, the audible indicating device 73 becomes energized, assuming the switch pole 76 to be in engagement with the contact 75, through a circuit comprising wire 72, resistor 74, the winding of the device 73, the contact 75, the switch pole 76, the wire 78, the contact 44, the armature 38 and the grounded wire 63. Under these conditions both a visual indication is provided by the energization of lamp 32, and an audible indication is provided, by the energization of the buzzer or other audible alarm device 73.

In the arrangement illustrated in FIGURE 4, as an alternative to the energization of the buzzer or other audible alarm device 73, the restraining solenoid 81 may be placed in operation. As shown, one terminal of solenoid 81 is connected to ground, and the other terminal thereof is connected by a wire 84 to the stationary contact 85 of the relay 80. The armature 86 of said relay is connected to a wire 87, to which is also connected the remaining terminal of the winding of relay 80, as shown. Wire 87 is connected through a bimetal thermal switch 88 and a wire 89 to the positive battery terminal wire 72. Thus, with the switch pole 76 in engagement with the contact 77, when the relay 35 becomes energized, in the manner above described, a circuit is completed to energize the relay 80, said circuit comprising the wire 72, the wire 89, the bimetal thermal switch 88, which is normally closed, the wire 87, the winding of relay 80, the wire 79, switch contact 77, pole 76, wire 78, relay contact 44, armature 38, and grounded wire 63. With relay 80 energized, armature 86 engages contact 85, energizing the solenoid 81 through a circuit comprising wire 89, the bimetal switch 88, wire 87, armature 86, contact 85, wire 84, the winding of solenoid 81, and ground. Due to the fact that a rather heavy current is drawn by the solenoid, because of its relatively low resistance, the heater winding 90 of the bimetal switch 88 generates a considerable amount of heat, and in a relatively short period the bimetal switch 88 opens, deenergizing the solenoid 81. However, after a short additional period, wherein the heater 90 cools, the bimetal switch 88 closes, reestablishing the energization of the solenoid 81, and providing an intermittent speed-inhibiting action, now to be described.

Solenoid 81 is mounted in the vehicle adjacent the fuel supply control rod 91, as shown in FIGURE 2, the control rod 91 being mechanically linked to the accelerator pedal in the usual manner and being connected so that the speed of the vehicle may be regulated by movement of said control rod 91. In the arrangement illustrated in FIG- URE 2, increase in speed is produced by downward movement of control rod 91, the force required to move the control rod 91 downwardly being provided at the vehicle accelerator pedal, not shown. A connecting rod 93 is secured to the lower portion of the solenoid plunger 94, depending therefrom through a U-shaped bracket 95 and being slidable through the bight portion 96 of said bracket. The lower end of the connecting rod 93 is connected to the control rod 91 in the manner illustrated, for example, by the provision of a collar member 97 clamped to the control rod and a plurality of chain links 98 with an intervening heavy spring 99. A coiled spring 100 is vertically mounted in the bracket 95, surrounding the rod 93 and bearing between the bight portion 96 of the bracket and the bottom end of the plunger 94, biasing the plunger 94 upwardly, substantially to the position illustrated in FIGURE 2. The spring 100 is relatively yieldable, so that normally it imposes no substantial restraint on the movement of the fuel supply control rod 91. However, when the solenoid 81 is energized, the solenoid exerts a substantial restraining force on the plunger 94, which opposes the downward movement of the control rod 91, and which requires the operator of the vehicle to provide a relatively large force on the accelerator pedal in order to maintain the speed of the vehicle or to increase same.

It will thus be apparent that when the limiting high speed of the vehicle is obtained, namely, the speed of the vehicle wherein the relay 35 becomes energized, with switch pole 76 set to engage contact 77, the solenoid 81 becomes energized and applies a restraining force on its plunger 94 which opposes the downward movement of the movable fuel supply control rod 91. The restraining force developed by the solenoid 81 is of an intermittent nature, since after a short time interval the thermal switch 88 opens, but if the vehicle speed continues at or above the high limiting value, the thermal switch 88 again closes, reenergizing the solenoid 81, and again applying the restraining force to the control rod 91. This action continues intermittently as long as the vehicle speed is above a safe limiting value, namely, is at a speed high enough to cause the lamp 32 to be energized.

As above mentioned, while the restraining force developed by the solenoid 81 is substantial, it is still possible for the vehicle operator, by applying sufficient force to the accelerator pedal, to overcome such restraining force and to allow the vehicle speed to be increased sufficiently, if so required, for example, in order to pass another vehicle. However, it is difficult for the operator of the vehicle to maintain the excessive speed for any considerable length of time, because of the excessive force required for the operator to keep the accelerator pedal depressed.

As will be readily apparent, the speed restraining feature is optional, since the switch 22 may be operated to an open position, if so desired by the vehicle operator. Alternatively, the switch 22 may be operated to cause pole 76 to engage the stationary contact 75, whereby the buzzer or other electrically operated audible signal device 73 will be energized when the vehicle exceeds a safe predetermined high limiting speed, namely, the speed at which relay 35 becomes energized.

As will be further apparent, the vehicle operator may employ either the audible signal device 73, by adjusting switch pole 76 to engage contact 75, or may rely on the speed inhibiting action of solenoid 81 by adjusting pole 76 to engage the contact 77. In the normal open position of the three position switch 22, illustrated in FIGURE 4, the device will operate to provide only the respective speed value indications provided by the lamps 30, 31 and 32.

The rheostat 17 may be adjusted to provide a coarse adjustment of the initial speed required to energize the relay 33, and subsequently the relays 34 and 35, in accordance with the scale 20 which is disposed adjacent the pointer 19 of knob 18. Thus, the pointer 19 may be set to a value corresponding to the speed at which it is desired that relay 33 becomes energized. Further adjustment is obtained by means of the rheostat 24. The circuit adjustment of the relay 34 is likewise accomplished by means of the rheostat 25, whereby the relay 34 will become energized at a predetermined speed higher than that at which the relay 33 becomes energized. Similarly, the adjustment of the circuit of relay 35 is accomplished by means of the rheostat 26, which may be set to cause relay 35 to become energized at the maximum safe speed value, which will be a speed value somewhat higher than that at which the relay 34 becomes energized.

While a specific embodiment of an improved speed indicating and speed inhibiting device for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle having an internal combustion engine and a movable fuel supply control member, a speed indicating and inhibiting device comprising an electrically operated speed indicating device, a solenoid having a movable plunger element, means connecting said plunger element to said fuel supply control member to inhibit movement of said member responsive to the energization of said solenoid, means to simultaneously energize said indicating device and said solenoid responsive to a predetermined speed of the engine, and means to deenergize said solenoid responsive to the energization thereof for a predetermined time period.

2. In a motor vehicle having an internal combustion engine provided with a distributor and a movable fuel supply control member, a speed indicating and inhibiting device comprising an electrically operated speed indicating device, a solenoid having a movable plunger element, means connecting said plunger element to said fuel supply control member to inhibit movement of said member responsive to the energization of said solenoid, means connected to said distributor to develop a voltage in accordance with the speed of the engine, means to simultaneously energize said indicating device and said solenoid responsive to a predetermined value of said voltage, and means to deenergize said solenoid responsive to the energization thereof for a predetermined time period.

3. In a motor vehicle having an internal combustion engine provided with a distributor and a movable fuel supply control member, speed inhibiting means comprising means connected to said distributor to develop a voltage in accordance with the speed of the engine, means to restrain movement of said fuel supply control member responsive to a predetermined value of said voltage, and means to render said restraining means inoperative responsive to a predetermined period of operation thereof.

4. In a motor vehicle having an internal combustion engine provided with a distributor and a movable fuel supply control member, speed inhibiting means comprising means connected to said distributor to develop a voltage in accordance with the speed of the engine, relay means connected to said last-named means and being energized responsive to a predetermined value of said voltage, restraining means connected to said fuel supply control member, means to operate said restraining means responsive to the energization of said relay means, and means to deenergize said relay means after a predetermined period of energization thereof, whereby to release said restraining means.

5. In a motor vehicle having an internal combustion engine provided with a distributor and a movable fuel supply control member, speed inhibiting means comprising means connected to said distributor to develop a voltage in accordance with the speed of the engine, relay means connected to said last-named means and being energized responsive to a predetermined value of said voltage, restraining means connected to said fuel supply control member, means to operate said restraining means responsive to the energization of said relay means, an electrically operated indicating device, means to energize said indicating device responsive to said energization of the relay means, and means to deenergize said relay means after a predetermined period of energization thereof, whereby to release said restraining means.

6. In a motor vehicle having an internal combustion engine provided with a distributor and a movable fuel supply control member, speed inhibiting means comprising means connected to said distributor to develop a voltage in accordance with the speed of the engine, an electrically operated indicating device including a plurality of indicating elements, means to selectively energize said indicating elements responsive to different values of said voltage, means to restrain movement of said fuel supply control member responsive to a predetermined value of said voltage, and means to render said restraining means inoperative responsive to a predetermined period of operation thereof.

7. In a motor vehicle having an internal combustion engine provided with a movable fuel supply control member, speed inhibiting means comprising a solenoid mounted on the vehicle and having a plunger connected to said fuel supply control member to restrain movement thereof responsive to energization of said solenoid, and means to periodically energize said solenoid for successive predetermined periods of time responsive to a predetermined speed of the engine.

8. In a motor vehicle having an internal combustion engine provided with a distributor and a movable fuel supply control member, speed inhibiting means comprising a solenoid mounted on the vehicle and having a plunger connected to said fuel supply control member to restrain movement thereof responsive to energization of said solenoid, means connected to said distributor to develop a voltage in accordance with the speed of the engine, and means to periodically energize said solenoid for successive predetermined periods of time responsive to a predetermined value of said voltage.

9. In a motor vehicle having an internal combustion engine provided with an electrically operated speed indicating device, a distributor and a movable fuel supply control member, speed inhibiting means comprising a solenoid mounted on the vehicle and having a plunger connected to said fuel supply control member to restrain movement thereof responsive to energization of said solenoid, means connected to said distributor to develop a voltage in accordance with the speed of the engine, means to periodically energize said solenoid for successive predetermined periods of time responsive to a predetermined value of said voltage, and means to energize said speed indicating device responsive to said predetermined value of said voltage.

10. In a motor vehicle having an internal combustion engine provided with a distributor and a movable fuel supply control member, speed inhibiting means comprising means connected to said distributor to develop a voltage in accordance with the speed of the engine, a solenoid, means operated responsive to energization of said solenoid to restrain movement of said fuel supply control member, means to energize said solenoid responsive to a predetermined value of said voltage, and timed switch means in circuit with said solenoid and operated by the solenoid current to open responsive to a predetermined period of energization of said solenoid.

11. In a motor vehicle having an internal combustion engine provided with a distributor and a movable fuel supply control member, speed inhibiting means comprising means connected to said distributor to develop a voltage in accordance with the speed of the engine, a solenoid, means operated responsive to energization of said solenoid to restrain movement of said fuel supply control member, means to energize said solenoid responsive to a predetermined value of said voltage, and a timed switch having a heater winding in circuit with said solenoid and operated by the solenoid current and having heat-responsive contacts operated by said heater winding to open responsive to a predetermined period of energization of said solenoid.

References Cited in the file of this patent

UNITED STATES PATENTS

| 2,260,576 | Maybach | Oct. 28, 1941 |
| 2,611,352 | Molyneux | Sept. 23, 1952 |
| 2,816,617 | Sen Lin Lee | Dec. 17, 1957 |
| 2,822,882 | Campbell | Feb. 11, 1958 |
| 2,908,264 | Kerr | Oct. 13, 1959 |
| 3,036,562 | Scott | May 29, 1962 |